United States Patent [19]

Kanai et al.

[11] Patent Number: 5,048,860
[45] Date of Patent: Sep. 17, 1991

[54] VEHICLE SUSPENSION SYSTEM

[75] Inventors: Seita Kanai; Koji Tsuji, both of Hiroshima; Toshiro Kondo, Hatsukaichi; Takeshi Edahiro, Higashihiroshima, all of Japan

[73] Assignee: Mazda Motor Corporation, Hiroshima, Japan

[21] Appl. No.: 463,255

[22] Filed: Jan. 10, 1990

[30] Foreign Application Priority Data

Jan. 13, 1989 [JP] Japan .................................. 1-4873

[51] Int. Cl.$^5$ .............................................. B60G 3/00
[52] U.S. Cl. ...................................... 280/691; 280/660; 280/661; 280/675
[58] Field of Search ............... 280/661, 691, 690, 699, 280/700, 701, 96.1, 693, 694, 688, 660, 664, 675

[56] References Cited

U.S. PATENT DOCUMENTS

| | | | |
|---|---|---|---|
| 4,538,831 | 9/1985 | Kami et al. | 280/670 |
| 4,570,968 | 2/1986 | Mukau et al. | 280/664 |
| 4,570,969 | 2/1986 | Tsutsumi et al. | 280/664 |
| 4,744,586 | 5/1988 | Shibahata et al. | 280/661 |
| 4,805,940 | 2/1989 | Ohno et al. | 280/661 |
| 4,875,703 | 10/1989 | Murakami | 280/689 |
| 4,934,729 | 6/1990 | Murata | 280/688 |

FOREIGN PATENT DOCUMENTS

| | | |
|---|---|---|
| 0136563 | 4/1985 | European Pat. Off. |
| 2255676 | 5/1973 | Fed. Rep. of Germany |
| 52-9889 | 3/1977 | Japan |
| 2198997 | 6/1988 | United Kingdom |

Primary Examiner—Richard A. Bertsch
Attorney, Agent, or Firm—Fleit, Jacobson, Cohn, Price, Holman & Stern

[57] ABSTRACT

A vehicle suspension system comprises a wheel carrying member for rotatably carrying a wheel of a vehicle. The wheel carrying member is provided with an extension extending upwardly. A first upper arm member extends in a substantially longitudinal direction of the vehicle and is pivotally connected at one end with an upper end portion of said the extension and at the other end with a vehicle body member. A second upper arm member is arranged downward of the first upper arm member, extending in a substantially transverse direction of the vehicle and pivotally connected at one end with the wheel carrying member and at the other end with the vehicle body member. A lower arm is connected at one end with a lower portion of the wheel carrying member and at the other end with the vehicle body member for restricting at least a longitudinal and transverse movement of the wheel carrying member. A desirable camber and caster angle control can be accomplished.

20 Claims, 10 Drawing Sheets

VEHICLE SUSPENSION SYSTEM

BACKGROUND OF THE INVENTION

1. Field of the Invention

The present invention relates to a vehicle suspension system.

2. Description of the Prior Art

Japanese Utility Model Public Disclosure No. 62-187904, laid open to the public in 1987 (corresponding to U.S. Pat. No. 4,570,968), discloses a so called "double wishbone" type vehicle suspension system which is provided with A-shaped upper and lower arms for carrying vehicle wheels. Such a double wishbone type suspension is advantageous in that is suppresses squatting at the time of starting the vehicle, changes in camber, and the like. On the other hand, the double wish bone type suspension is disadvantageous in that it causes a deterioration of riding comfort, and produces a brake judder.

In view of this, Japanese Utility Model Publication No. 62-1762, published for opposition in 1987 (corresponding to U.S. Pat. No. 4,538,831), discloses so called "high mount double wish bone" type vehicle suspension.

It should, however, be noted that this type of suspension is disadvantageous in the following point.

An upper arm of the suspension as disclosed in Japanese Utility Model Public Disclosure No. 62-1762 is relatively short and disposed oblique to the vehicle wheels in an up and down direction. As a result, the movement of the vehicle wheels is restricted in the up and down direction. Furthermore, a camber angle change may be unduly increased.

SUMMARY OF THE INVENTION

It is, therefore, an object of the invention to provide a vehicle suspension system which can provide a desirable camber angle change property.

It is another object of the invention to provide a vehicle suspension system which can suppress a brake judder effectively under a braking condition.

It is further object of the invention to provide a vehicle rear suspension system by which an improved riding comfort can be obtained.

According to the present invention, a vehicle suspension system comprises wheel carrying means for rotatably carrying a wheel of a vehicle, the wheel carrying means being provided with an extension extending upwardly, first upper arm member extending in a substantially longitudinal direction of the vehicle and pivotally connected at one end with an upper end portion of said extension and at the other end with a vehicle body member, second upper arm member arranged downward of the first upper arm member, extending in a substantially transverse direction of the vehicle and pivotally connected at one end with the wheel carrying means and at the other end with the vehicle body member, lower arm means connected at one end with a lower portion of the wheel carrying member and at the other end with the vehicle body member for restricting at least a longitudinal and transverse movement of the wheel carrying means.

Preferably, the extension is of an inwardly arcuate configuration that extends upwardly along an inside of a tire of the wheel.

An upper end of the extension may be projected beyond an upper end of the tire of the wheel in a preferred embodiment.

An upper end portion of the extension may be arched outwardly.

The first upper arm member is pivotally connected at a front end with the upper end portion of the extension and at a rear end with the vehicle body member.

This invention can be suitably applied for both a front and rear suspension systems.

The first upper arm member extends and upwardly in the front suspension system.

The first upper arm member is pivotally connected at a front end with the vehicle body member and at a rear end with the wheel carrying member. The first upper arm member extends rearwardly and upwardly in the rear suspension system. The second upper arm member is pivotally connected at an inner end with the vehicle body member and at an outer end with the wheel carrying means. In this case, the connection of the outer end with the wheel carrying member is located at a position higher than a wheel carrying portion of the wheel carrying means and lower than an upper end of a rim of the wheel wherein the wheel carrying means rotatably carries the wheel by the wheel carrying portion.

The first and second upper arm members are provided with means for adjusting the lengths thereof, respectively example a turnbuckle can be used.

The lower arm means may be of an A-shaped configuration. In this case, the lower arm means is pivotally connected at biforked inner ends with the vehicle body member and at a single outer end with the wheel carrying means.

In a preferred embodiment, the connecting points between the wheel carrying means and the first upper arm member, between the wheel carrying means and the second upper arm member, and between the wheel carrying means and the lower arm means are substantially on a single straight line. The suspension system may further comprise link means for restricting a pivotal movement of the wheel about the line, such as a tie rod controlled by a steering control device.

The lower arm means may include a pair of lower arm members extending substantially transversely and a trailing link extending substantially longitudinally. The suspension system may further comprise a shock absorber for absorbing an impact load in an up and down direction. The shock absorber is disposed opposite to the first upper arm member, with regard to the second upper arm means in the longitudinal direction.

The shock absorbing means comprises a coil spring and a damper.

As aforementioned, the first upper arm member is arranged away from the wheel carrying means enough to provide a bushing between the first upper arm member and the wheel carrying means with a soft property. As a result, an improved riding comfort can be obtained and the brake judder can be suppressed effectively.

The second upper arm, which controls the transverse movement of the wheel carrying means, can provide with a desirable camber angle change property in association with the lower arm means.

Where the second upper arm member is arranged below the upper end of the rim of the wheel, the length of the second upper arm member can be increased to provide an improved camber angle change property in case of bumping and rebounding action of the vehicle.

In the above structure, the upper arm means is constituted by only one pair of arm members, not by the A-shaped arm, so that a layout of the members of the suspension can be facilitated. Since the first and second upper members are independent from each other, the camber and caster can be controlled separately. The inclination of the first upper arm provides an anti-diving effect in front wheels and an anti-lifting effect in rear wheels.

The above and other objects and features of the present invention can be understood based on the following description, taking reference to the accompanying drawings.

DESCRIPTION OF THE PREFERRED EMBODIMENT

Figure 1:
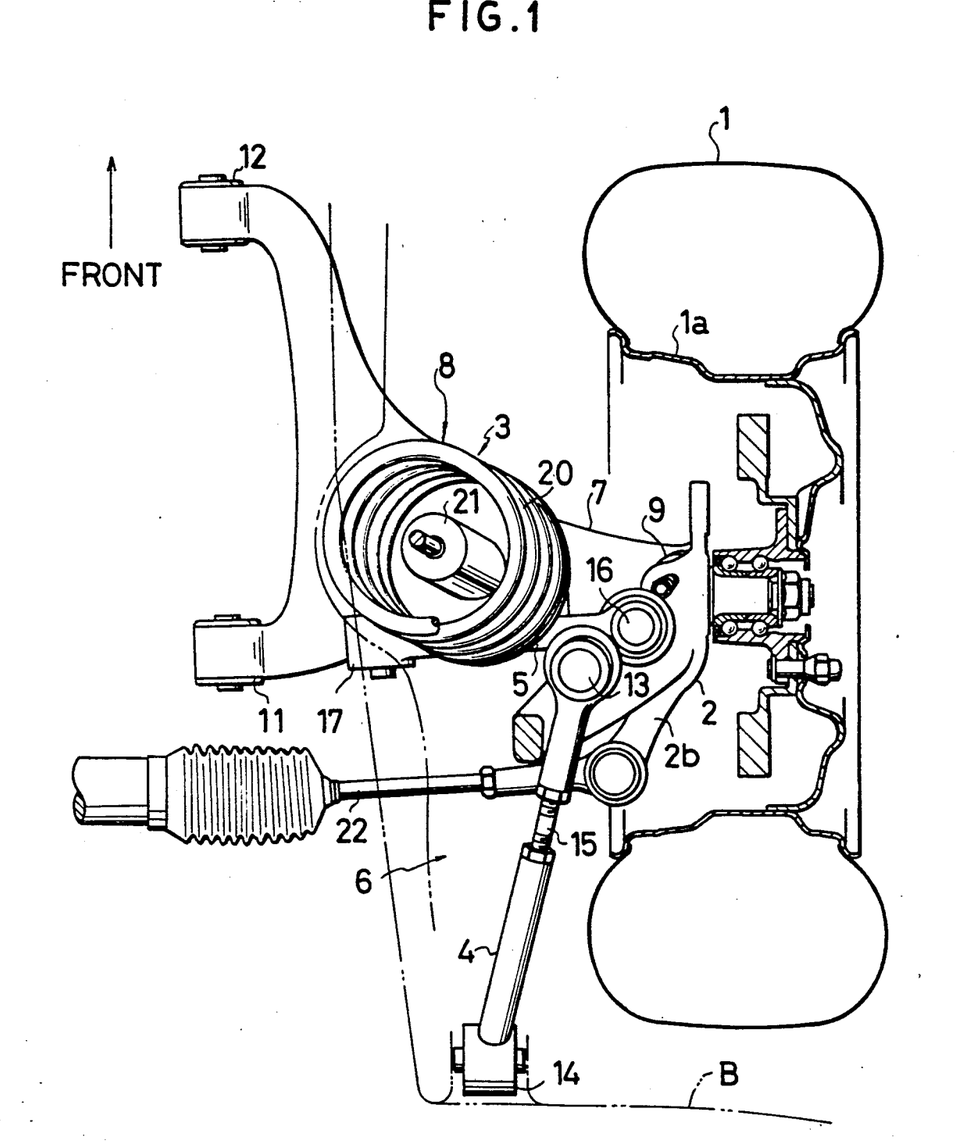
FIG. 1 is a plan view of a right front suspension system of a preferred embodiment in accordance with the present invention.
Figure 2:
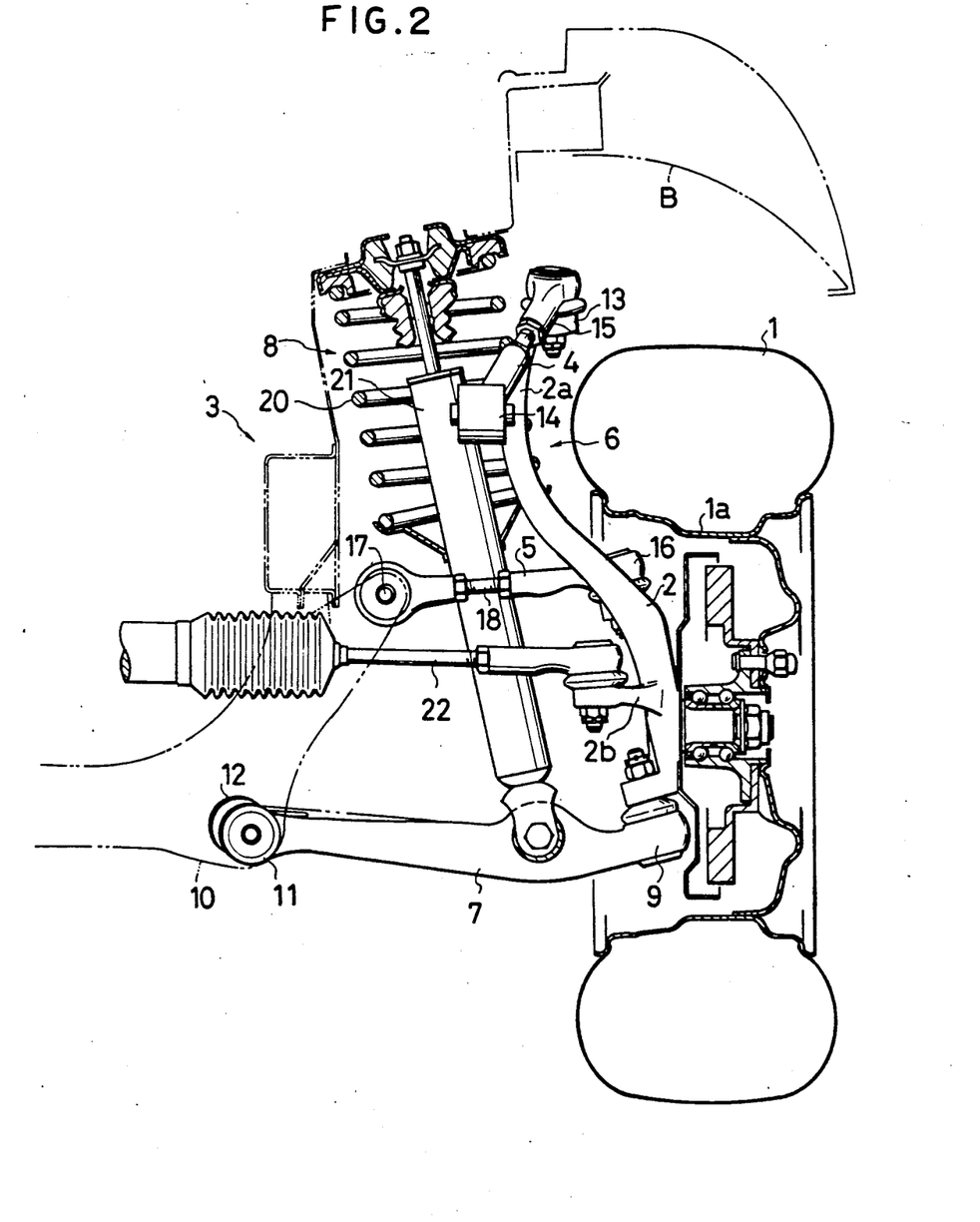
FIG. 2 is an elevational view seen from a rearwardly of the suspension system of FIG. 1.
Figure 3:
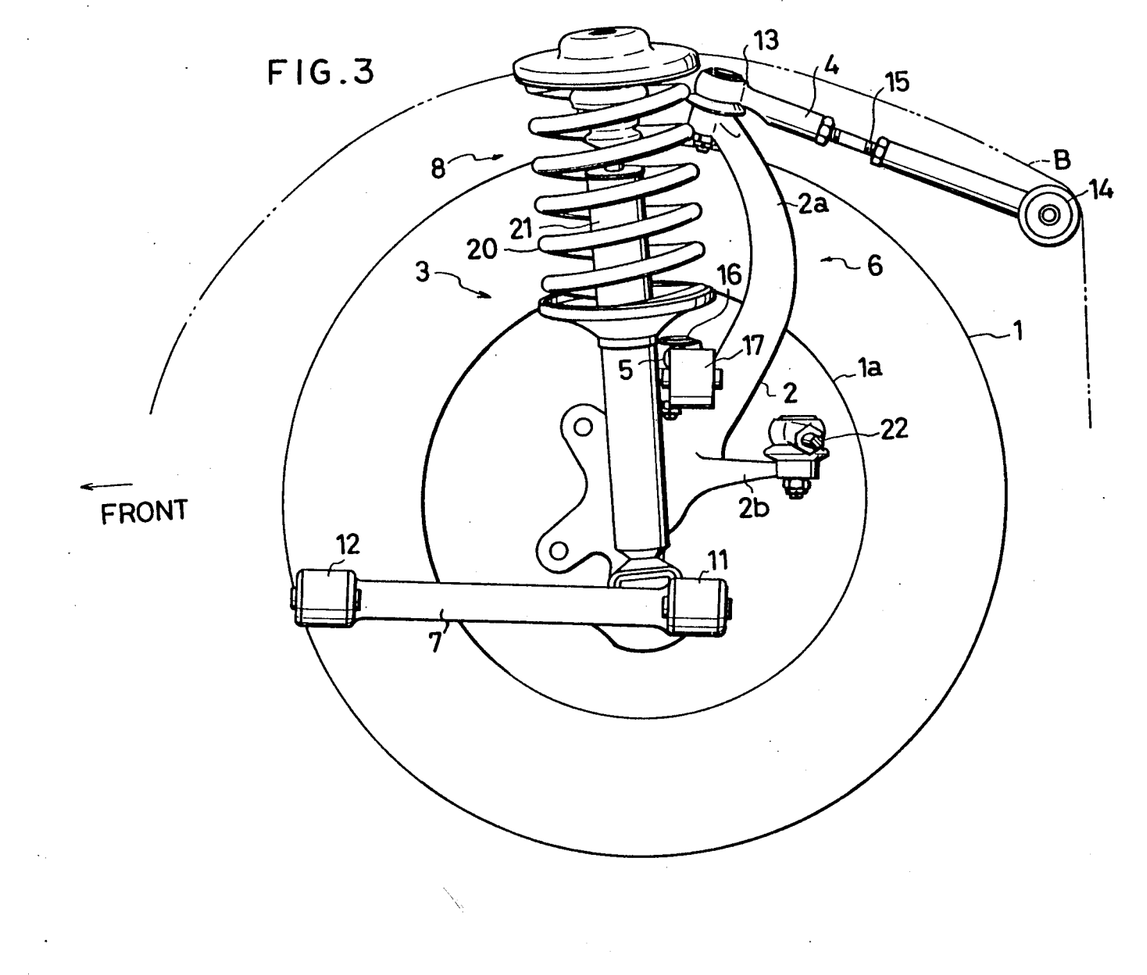
FIG. 3 is an elevational view seen from an interior of the suspension system of FIG. 1.

Referring to the drawings, specifically to FIGS. 1-3, there is shown a vehicle right front suspension system in accordance with a preferred embodiment of the present invention.

A right front wheel 1 is rotatably carried by a suspension carrying member 2 and connected to a vehicle body B through a suspension system 3. The wheel carrying member 2 is provided with an extension 2a of an arcuate configuration extending upwardly along an inside of the wheel 1 beyond an upper end of a rim 1a, preferably an upper end of a tire. The extension 2a extends at first upwardly and inwardly at a base portion thereof and then upwardly outwardly in an upper end portion. The suspension system 3 comprises an upper arm device 6 having a first upper arm 4 and a second upper arm 5 as link members, an A-shaped lower arm 7 and a shock absorber 8. The lower arm 7, extending substantially in a transverse direction of a vehicle, is connected at a converged outer end thereof to a lower end of the wheel carrying member 2 for a swingable movement about a substantially vertical axis through a rubber bushing 9. Biforked inner ends of the lower arm 7 are connected to a cross member of the body B through rubber bushings 11 and 12 for a swingable movement about a horizontal axis extending in a longitudinal direction of the vehicle. In this case, the rubber bushings 11 and 12 are arranged in parallel with a vehicle center line in the longitudinal direction.

The first upper arm 4 extends substantially rearwardly from the wheel carrying member 2 in the longitudinal direction above the upper end of the rim 1a of the wheel 1. The first upper arm 4 which functions to restrict a longitudinal movement of the wheel carrying member 2 is connected at a front end with the extension 2a through a rubber bushing 13 for a pivotal movement about a vertical axis and at a rear end with the vehicle body B through a rubber bushing 14 for a pivotal movement about a horizontal axis. The first upper arm 4 slightly inclines rearwardly and downwardly. This inclination of the arm 4 positions an instantaneous center of the pivotal movement of the wheel carrying member 2 at a rear side of a wheel rotation center, wherein the instantaneous center is defined by an attitude of the arm 4 and a line passing the rubber bushings 11 and 12 of the lower arm 7. This produces an anti-diving effect at the time of braking condition of the vehicle.

The arm 4 is provided at an intermediate portion with a turnbuckle 15 for adjusting the caster angle of the wheel 1.

The second upper arm 5 extends substantially transversely for restricting a transverse movement of the wheel carrying member 2. The second upper arm 5 is connected at an outer end with the wheel carrying member 2 through a rubber bushing 16 for a pivotal movement about a substantially vertical axis and at an inner end with the cross member 10 through a rubber bushing 17 for a pivotal movement about a longitudinally extending horizontal axis. The joint between the outer end of the arm 5 and the wheel carrying member 2 is located lower than the upper end of the rim 1a. The length of the second upper arm 5 is substantially equal to that in an uneven length type of conventional double wishbone suspension system, and longer than an upper arm disclosed in the Japanese Utility Model publication No. 62-1762.

The second upper arm 5 is provided at an intermediate portion with a turnbuckle 18 so as to adjust the camber angle of the wheel 1.

The wheel carrying member 2 is provided with a knuckle portion 2b extending inwardly rearwardly to which a tie rod 22 is pivotally connected about a substantially vertical axis.

The rubber bushing 9 disposed at an outer connecting point between the lower arm member 7 and the wheel carrying member 2, the rubber bushing 13 disposed at an outer connecting point between the first upper arm member 4 and the wheel carrying member 2 and the rubber bushing 17 disposed at an outer connecting point between the second upper arm member 5 and the wheel carrying member 2 are located to be substantially on a single straight line. The tie rod 22 is controlled by a steering control device to provide the wheel 1 with a pivotal movement about the single straight line as a pivotal axis of a steering action.

The shock absorber 8 extends in the up and down direction and is provided with a coil spring 20 and a damper 21. The shock absorber 8 is connected at a lower end with the lower arm 7 for a pivotal movement about a substantially longitudinally extending horizontal axis and at an upper end with the vehicle body B for a slightly pivotal movement about its axis.

With this structure, the first upper arm 4 is disposed above than the upper end of the rim 1a so that a distance between the joint of the arm 4 with the wheel carrying member and the rotation center of the wheel 1 is increased. This enables the bushing 14 between the vehicle body B and the arm 4 to be softer in rigidity to thereby improve the riding comfort and suppress the brake judder.

The first upper arm 4 extends substantially transversely and is provided with the turnbuckle 15 for adjusting the caster angle of the wheel 1. On the other hand, the second upper arm 5 extends substantially longitudinally and is provided with the turnbuckle 18 for adjusting the camber angle of the wheel 1. It will, therefore, be understood that the respective adjustments for the caster and camber angles are not influenced by each other.

The first and second upper arms 4 and 5 are separated as aforementioned to facilitate a layout therefor.

The second upper arm 5 is disposed at a position lower than the upper end of the rim 1a in a location where there is a space extending horizontally. This enables the second upper arm 5 to have a length great enough to provide a desirable camber angle change property for the wheel 1.

Figure 4:
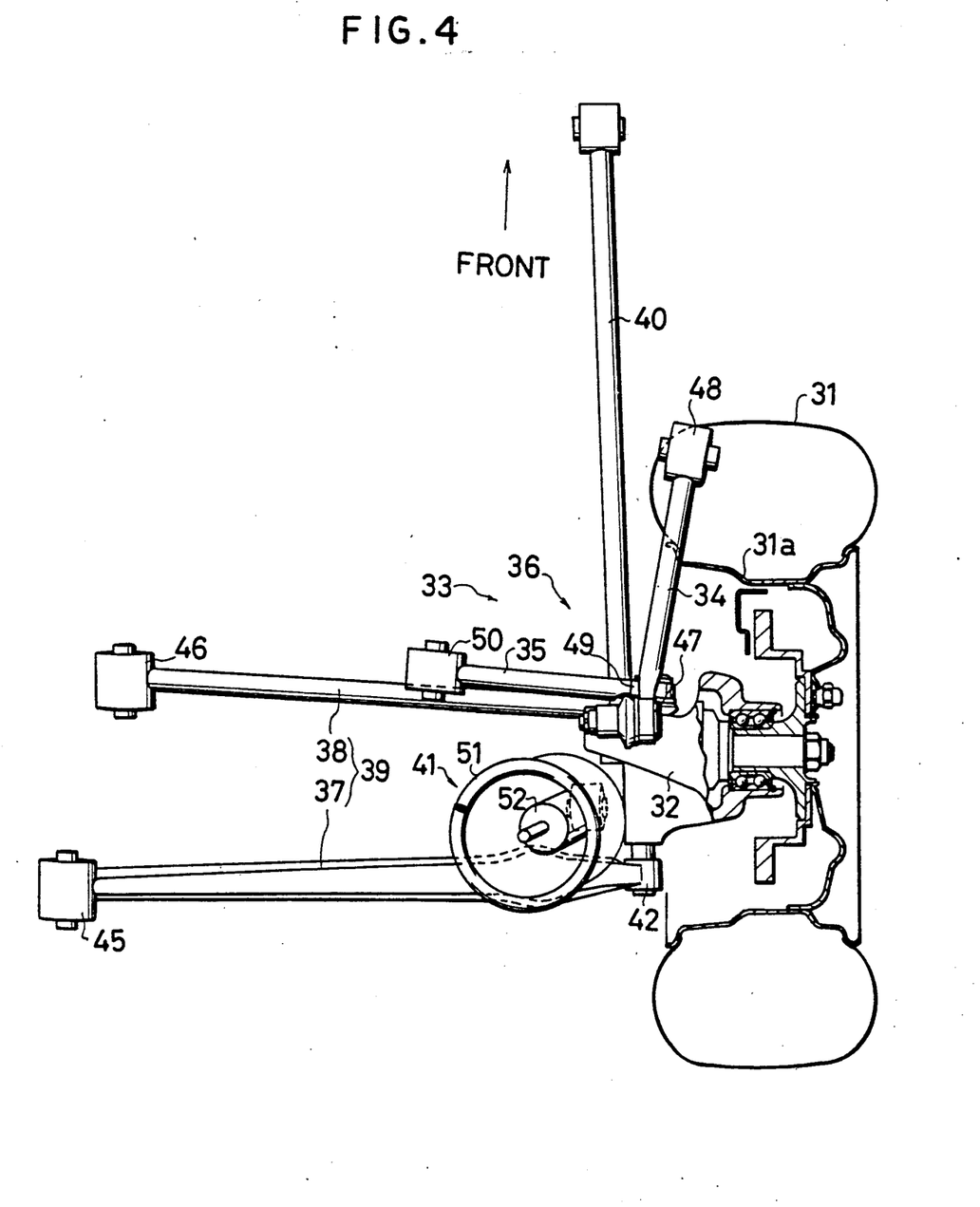
FIG. 4 is a plan view of a right rear suspension system of another embodiment in accordance with the present invention.
Figure 5:
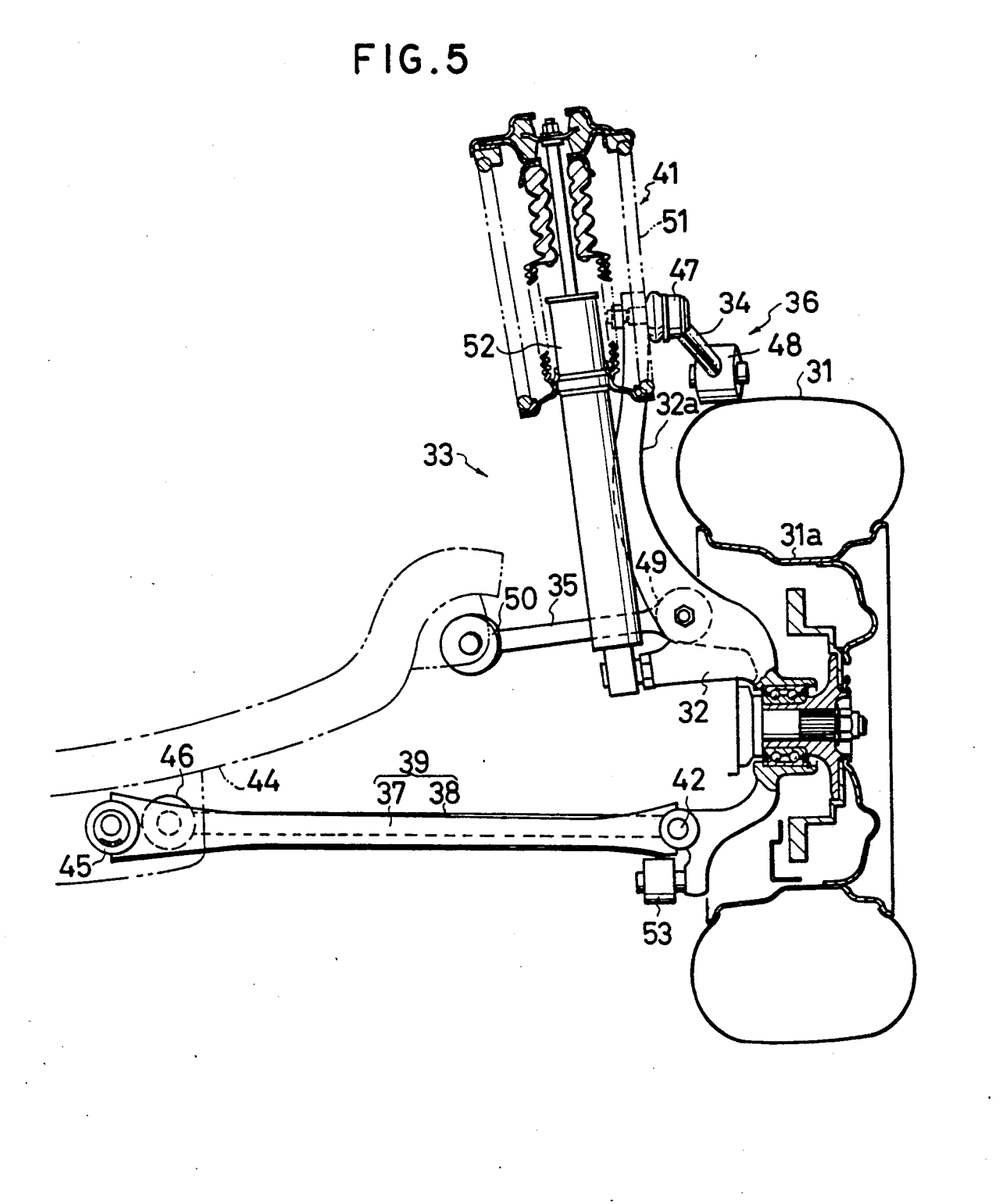
FIG. 5 is an elevational view similar to FIG. 2 but showing the embodiment of FIG. 4.
Figure 6:
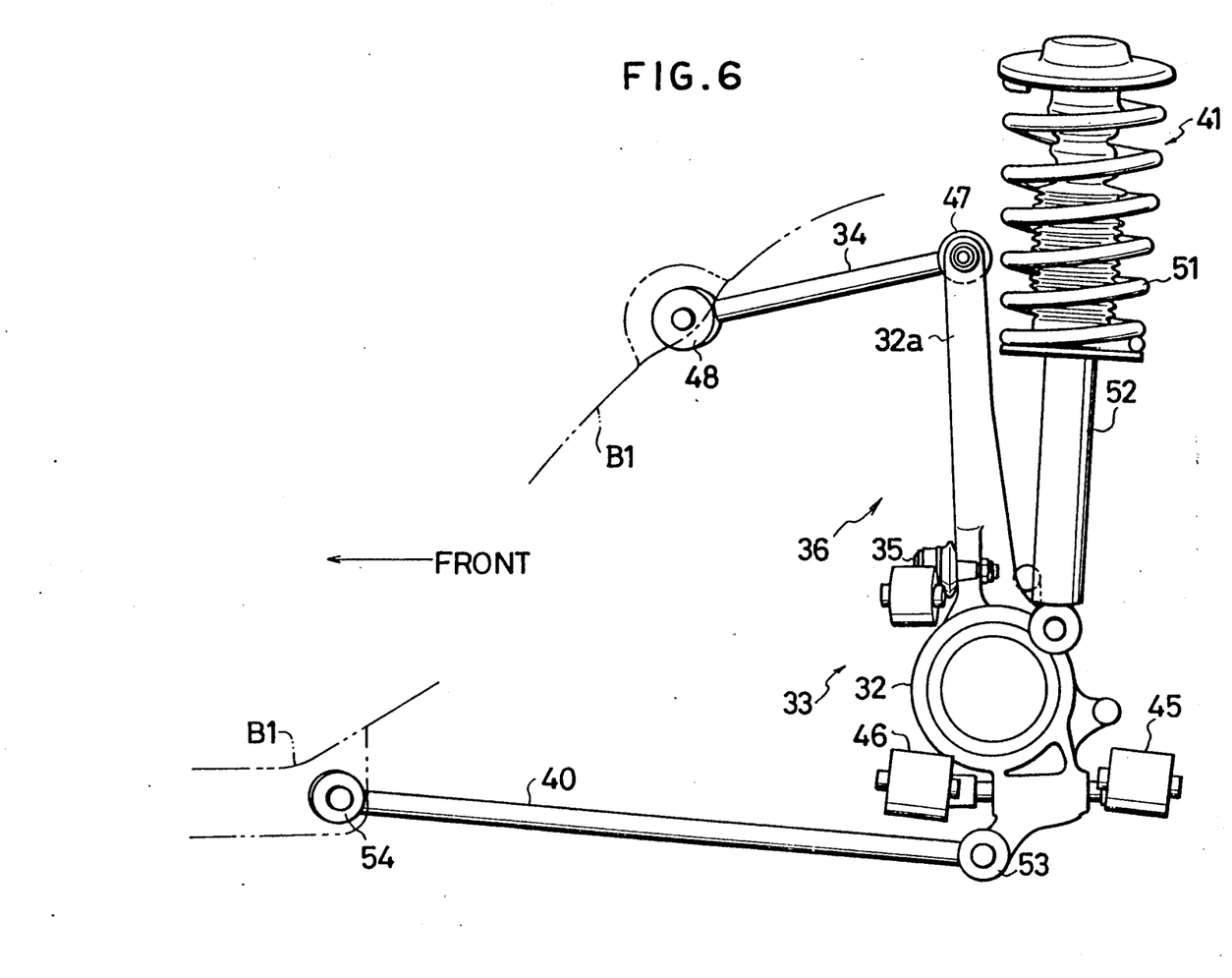
FIG. 6 is an elevational view similar to FIG. 3 but showing the embodiment of FIG. 4.

Referring to FIG. 4, 5 and 6, there is shown another embodiment of the present invention.

In this embodiment, the present invention is applied to a right rear suspension.

A right rear wheel 31 is rotatably carried by a suspension carrying member 32 and connected to a vehicle body B1 through a suspension system 33. The wheel carrying member 32 is provided with an extension 32a extending upwardly along an inside of the wheel 31 beyond an upper end of a rim 31a. The suspension system 33 comprises an upper arm device 36 having a first upper arm 34 and a second upper arm 35 as link members, a lower arm device 39 including a first lower arm 37 and a second lower arm 38, a trailing arm 40 and a shock absorber 41. The first and second lower arms 37 and 38 of the lower arm device 39 extending substantially transversely are connected at outer ends to lower ends of the wheel carrying member 2 for swingable movements about substantially horizontal axes through rubber bushings 42 and 43 and at inner ends with a cross member 44 through rubber bushings 45 and 46 for swingable movements about substantially longitudinally extending horizontal axes. In this case, the rubber bushings 45 and 46 are arranged in parallel with the vehicle center line in the longitudinal direction.

The first upper arm 34 extends substantially forwardly from the wheel carrying member 32 in the longitudinal direction above the upper end of the rim 31a of the wheel 31. The first upper arm 34 which functions to restrict a longitudinal movement of the wheel carrying member 32 is connected at a front end with the extension 32a through a rubber bushing 47 for a pivotal movement about a vertical axis and at a rear end with the vehicle body B1 through a rubber bushing 48 for a pivotal movement about a horizontal axis. The first upper arm 34 slightly inclines forwardly and downwardly. This inclination of the arm 34 positions an instantaneous center of the pivotal movement of the wheel carrying member 32 at a front side of the wheel rotation center wherein the instantaneous center is defined by an attitude of the arm 34 and a line connecting the rubber bushings 45 and 46 for the lower arm 39. This results in an anti-lifting effect at the time of braking condition of the vehicle.

The second upper arm 35 extends substantially transversely for restricting a transverse movement of the wheel carrying member 32. The second upper arm 35 is connected at an outer end with the wheel carrying member 32 through a rubber bushing 49 for a pivotal movement about a substantially longitudinally extending horizontal axis and at an inner end with the cross member 44 through a rubber bushing 50 for a pivotal movement about a longitudinally extending horizontal axis. The joint between the outer end of the arm 35 and the wheel carrying member 32 is located lower than the upper end of the rim 31a. The length of the second upper arm 35 is substantially equal to that in an uneven length type of conventional double wishbone suspension system, and longer than an upper arm disclosed in the Japanese Utility Model publication No. 62-1762.

The shock absorber 41 extends in the up and down direction and is provided with a coil spring 51 and a damper 52. The shock absorber 41 is connected at a lower end with the wheel carrying member 32 for a pivotal movement about a substantially transversely extending horizontal axis and at an upper end with the vehicle body B1 for a slightly pivotal movement about its axis.

The trailing link 40 is connected at a rear end with the wheel carrying member 32 through a rubber bushing 53 for a pivotal movement about a substantially transversely extending horizontal axis and at a front end with the vehicle body B1 for a pivotal movement about a substantially transversely extending horizontal axis.

Figure 7:
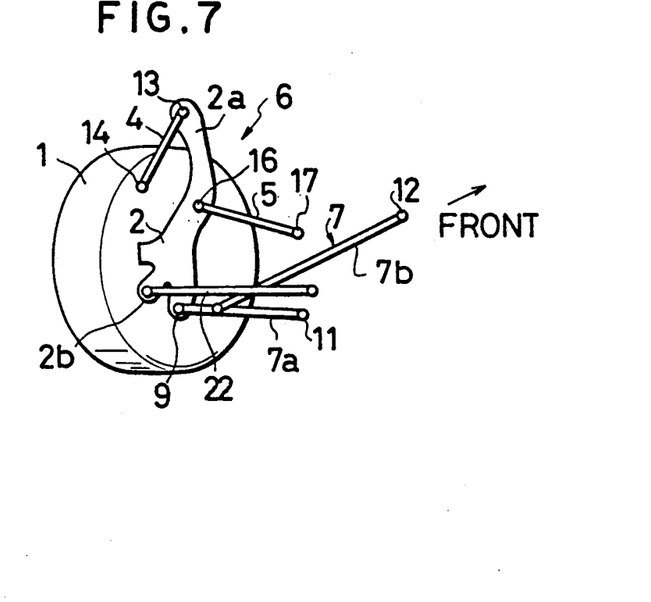
FIG. 7 is a schematic perspective view showing a further embodiment of a right front suspension system in accordance with the present invention.

Referring to FIG. 7, there is shown further embodiment of the present invention applied to a left front wheel 1. This structure is preferably applied to the front suspension system. The lower arm device 7 is constituted by a pair of link members 7a, 7b. The link member 7b is connected with an intermediate portion of the link member 7a. The same effect as the first mentioned embodiment can be obtained.

Figure 8:
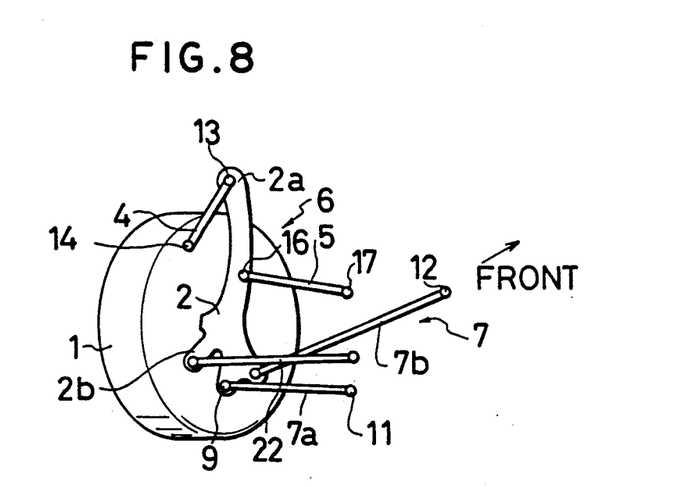
FIG. 8 is a schematic perspective view similar to FIG. 7 but showing still another embodiment of a right front suspension system in accordance with the present invention.

Referring to FIG. 8, there is still further embodiment for the left front suspension system.

In this embodiment, the link member 7b is not connected with the link member 7a but with the wheel carrying member 2.

Figure 9:
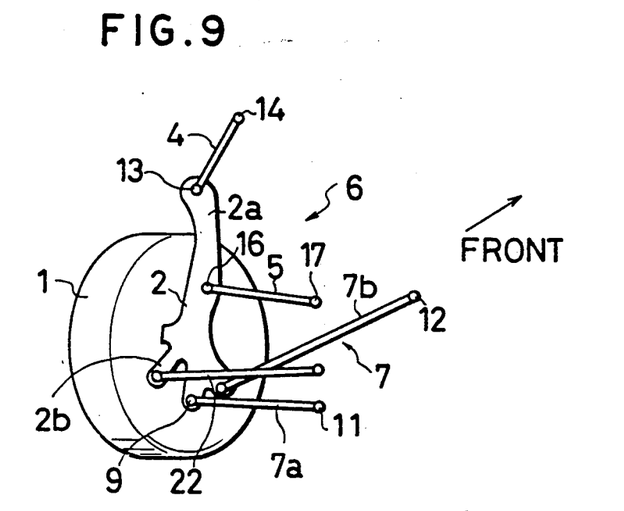
FIG. 9 is a schematic perspective view similar to FIG. 7 but showing still another embodiment of a right front suspension system in accordance with the present invention.

FIG. 9 shows yet another embodiment for the left front suspension. In this embodiment, the first upper arm 4 extends forwardly upwardly from the extension 2a.

Figure 10:
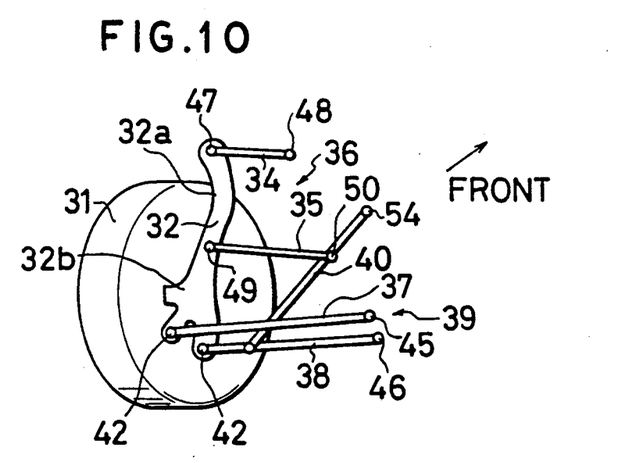
FIG. 10 is a schematic perspective view of another embodiment of the right rear suspension system in accordance with the present invention.

FIG. 10 shows another embodiment for the left rear suspension.

In this embodiment, the trailing arm 40 extends longitudinally and is connected with an intermediate portion of the first lower arm 38 for a swingable movement in the up and down direction.

Figure 11A:
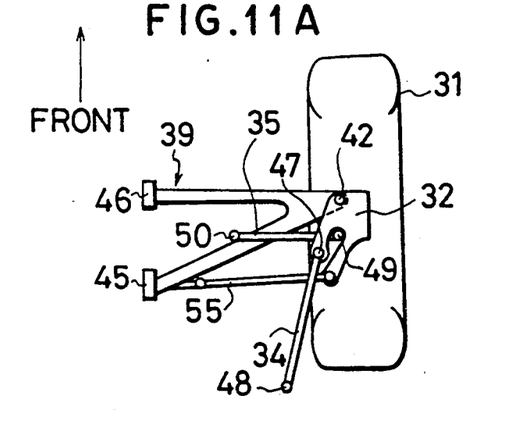
FIG. 11A is a schematic plan view showing still another embodiment of the right rear suspension system in accordance with the present invention.
Figure 11B:
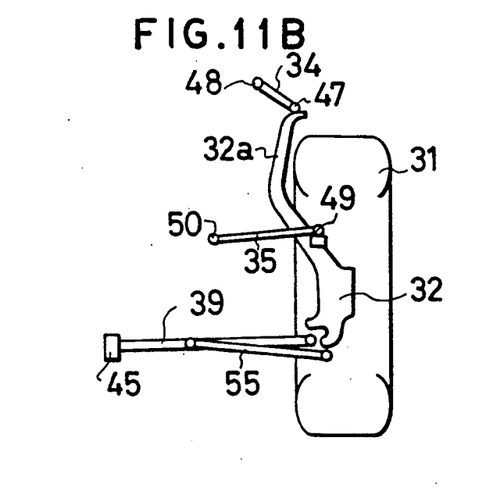
FIG. 11B is a schematic elevational view seen rearwardly of the suspension system of FIG. 11A.
Figure 11C:
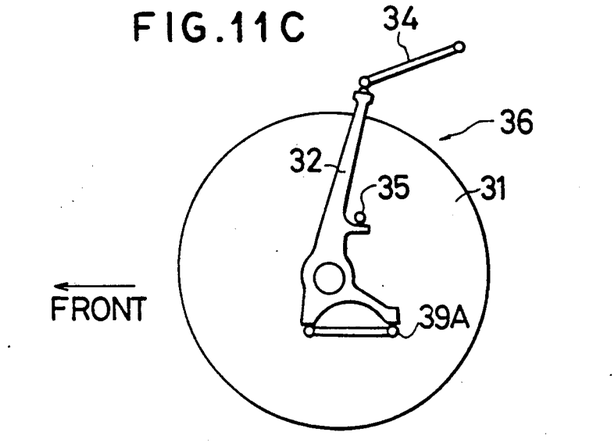
FIG. 11C is a schematic elevational view seen from an interior of the suspension system of FIG. 11A.

Referring to FIGS. 11A, 11B, and 11C, there is shown further embodiment for the right rear suspension. In this embodiment, the lower arm device 3 is constituted by an A-shaped arm. The lower arm device 39 is connected at an outer end with the wheel carrying member 32 and at inner ends with the vehicle body B1 for a swingable movement in the up and down direction. The rear suspension system 33 is provided with a toe control link 55 extending substantially transversely. The control link 55 is connected with a rear biforked portion of the lower arm device 39 at inner end for a swingable movement in a substantially horizontal plane and with a rear end portion of the wheel carrying member 32 at an outer end. This structure provides a desirable property in the toe direction change as well as in the camber angle change.

The first upper arm 34 may extend forwardly and downwardly so that the instantaneous center of the pivotal movement of the wheel 31 in a horizontal plane is located at a position forward of the wheel center.

Figure 12:
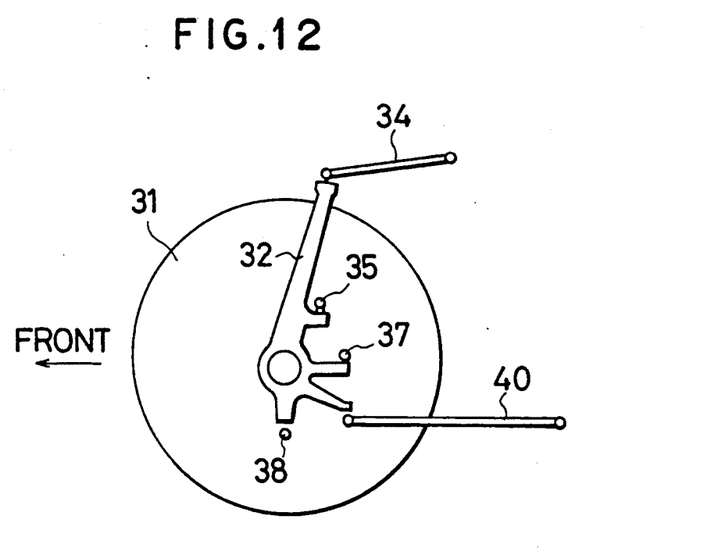
FIG. 12 is a schematic elevational view seen from an interior of a right rear suspension system of a still further embodiment of the present invention.

Referring to FIG. 12, still another embodiment of the right rear suspension is shown.

In this embodiment, the first upper arm 34 extends rearwardly and upwardly from the wheel carrying member 32 and the second lower arm 40 also extends rearwardly and inwardly from the wheel carrying member 32 so that the instantaneous center of the wheel 31 is located forward of the wheel center.

It will be understood from the above description that many modifications and variations may be made by those skilled in the art, but that all of them will fall into the spirit and the scope of the present invention as claimed below.

We claim:

1. A vehicle suspension system comprising:
   (a) wheel carrying means for rotatably carrying a wheel of a vehicle, the wheel carrying means being provided with an extension extending upwardly;
   (b) a first upper arm member extending in a substantially longitudinal direction of the vehicle and pivotally connected at one end with an upper end portion of said extension and at the other end with a vehicle body member;
   (c) a second upper arm member arranged downward of the first upper arm member, extending in a substantially transverse direction of the vehicle and pivotally connected at one end with the wheel carrying means and at the other end with the vehicle body member; and
   (d) lower arm means connected at one end with a lower portion of the wheel carrying means and at the other end with the vehicle body member for restricting at least a longitudinal and transverse movement of the wheel carrying means.

2. A vehicle suspension system as recited in claim 1 wherein the extension is of such an inwardly arcuate configuration that extends upwardly along an inside of a tire of the wheel.

3. A vehicle suspension system as recited in claim 2 wherein an upper end of the extension is projected beyond an upper end of the tire of the wheel.

4. A vehicle suspension system comprising:
   (a) wheel carrying means for rotatably carrying a wheel of a vehicle, the wheel carrying means being provided with an extension extending upwardly;
   (b) a first upper arm member extending in a substantially longitudinal direction of the vehicle and pivotally connected at one end with an upper end portion of said extension and at the other end with a vehicle body member;
   (c) a second upper arm member arranged downward of the first upper arm member, extending in a substantially transverse direction of the vehicle and pivotally connected at one end with the wheel carrying means and at the other end with the vehicle body member; and
   (d) lower arm means connected at one end with a lower portion of the wheel carrying means and at the other end with the vehicle body member for restricting at least a longitudinal and transverse movement of the wheel carrying means,
   wherein the extension is of such an inwardly arcuate configuration that it extends upwardly along an inside of a tire of the wheel, an upper end of the extension is projected beyond an upper end of the tire of the wheel, and an upper end portion of the extension is arched outwardly.

5. A vehicle suspension system comprising:
   (a) wheel carrying means for rotatably carrying a wheel of a vehicle, the wheel carrying means being provided with an extension extending upwardly;
   (b) a first upper arm member extending in a substantially longitudinal direction of the vehicle and pivotally connected at one end with an upper end portion of said extension and at the other end with a vehicle body member;
   (c) a second upper arm member arranged downward of the first upper arm member, extending in a substantially transverse direction of the vehicle and pivotally connected at one end with the wheel carrying means and at the other end with the vehicle body member; and
   (d) lower arm means connected at one end with a lower portion of the wheel carrying means and at the other end with the vehicle body member for restricting at least a longitudinal and transverse movement of the wheel carrying means,
   wherein the first upper arm member is pivotally connected at a front end with the upper end portion of the extension and at a rear end with the vehicle body member.

6. A vehicle suspension system as recited in claim 5 wherein the suspension system is a front suspension system.

7. A vehicle suspension system as recited in claim 6 wherein the first upper arm member extends forwardly upwardly.

8. A vehicle suspension system comprising:
   (a) wheel carrying means for rotatably carrying a wheel of a vehicle, the wheel carrying means being provided with an extension extending upwardly;
   (b) a first upper arm member extending in a substantially longitudinal direction of the vehicle and pivotally connected at one end with an upper end portion of said extension and at the other end with a vehicle body member;
   (c) a second upper arm member arranged downward of the first upper arm member, extending in a substantially transverse direction of the vehicle and pivotally connected at one end with the wheel carrying means and at the other end with the vehicle body member; and
   (d) lower arm means connected at one end with a lower portion of the wheel carrying means and at the other end with the vehicle body member for restricting at least a longitudinal and transverse movement of the wheel carrying means, wherein the first upper arm member is pivotally connected at a front end with the vehicle body member and at a rear end with the wheel carrying means.

9. A vehicle suspension system as recited in claim 8 wherein the suspension system is a rear suspension system.

10. A vehicle suspension system as recited in claim 9 wherein the first upper arm member extends rearwardly upwardly.

11. A vehicle suspension system comprising:
(a) wheel carrying means for rotatably carrying a wheel of a vehicle, the wheel carrying means being provided with an extension extending upwardly;
(b) a first upper arm member extending in a substantially longitudinal direction of the vehicle and pivotally connected at one end with a n upper end portion of said extension and at the other end with a vehicle body member;
(c) a second upper arm member arranged downward of the first upper arm member, extending in a substantially transverse direction of the vehicle and pivotally connected at one end with the wheel carrying means and at the other end with the vehicle body member; and
(d) lower arm means connected at one end with a lower portion of the wheel carrying means and at the other end with the vehicle body member for restricting at least a longitudinal and transverse movement of the wheel carrying means,
wherein the second upper arm member is pivotally connected at an inner end with the vehicle body member and at an outer end with the wheel carrying means, the connection of the outer end with the wheel carrying means being located at a position higher than a wheel carrying portion of the wheel carrying means and lower than an upper end of a rim of the wheel.

12. A vehicle suspension system comprising:
(a) wheel carrying means for rotatably carrying a wheel of a vehicle, the wheel carrying means being provided with an extension extending upwardly;
(b) a first upper arm member extending in a substantially longitudinal direction of the vehicle and pivotally connected at one end with an upper end portion of said extension and at the other end with a vehicle body member;
(c) a second upper arm member arranged downward of the first upper arm member, extending in a substantially transverse direction of the vehicle and pivotally connected at one end with the wheel carrying means and at the other end with the vehicle body member; and
(d) lower arm means connected at one end with a lower portion of the wheel carrying means and at the other end with the vehicle body member for restricting at least a longitudinal and transverse movement of the wheel carrying means,
wherein the first and second upper arm members are provided with means for respectively adjusting the lengths thereof.

13. A vehicle suspension system comprising:
(a) wheel carrying means for rotatably carrying a wheel of a vehicle, the wheel carrying means being provided with an extension extending upwardly;
(b) a first upper arm member extending in a substantially longitudinal direction of the vehicle and pivotally connected at one end with an upper end portion of said extension and at the other end with a vehicle body member;
(c) a second upper arm member arranged downward of the first upper arm member, extending in a substantially transverse direction of the vehicle and pivotally connected at one end with the wheel carrying means and at the other end with the vehicle body member; and
(d) lower arm means connected at one end with a lower portion of the wheel carrying means and at the other end with the vehicle body member for restricting at least a longitudinal and transverse movement of the wheel carrying means,
wherein the lower arm means is of an A-shaped configuration, and the lower arm means is pivotally connected at biforked inner ends with the vehicle body member and at a single outer end with the wheel carrying means.

14. A vehicle suspension system as recited in claim 13 wherein connecting points between the wheel carrying means and the first upper arm member, the second upper arm member and the lower arm means are substantially on a single straight line.

15. A vehicle suspension system as recited in claim 14 further comprising link means for restricting a pivotal movement of the wheel about said straight line.

16. A vehicle suspension system as recited in claim 14 wherein the link means is a tie rod which steers the vehicle in terms of a steering device.

17. A vehicle suspension system comprising:
(a) wheel carrying means for rotatably carrying a wheel of a vehicle, the wheel carrying means being provided with an extension extending upwardly;
(b) a first upper arm member extending in a substantially longitudinal direction of the vehicle and pivotally connected at one end with an upper end portion of said extension and at the other end with a vehicle body member;
(c) a second upper arm member arranged downward of the first upper arm member, extending in a substantially transverse direction of the vehicle and pivotally connected at one end with the wheel carrying means and at the other end with the vehicle body member; and
(d) lower arm means connected at one end with a lower portion of the wheel carrying means and at the other end with the vehicle body member for restricting at least a longitudinal and transverse movement of the wheel carrying means,
wherein said lower arm means comprises a pair of lower arm members extending substantially transversely and a trailing link extending substantially longitudinally of said vehicle.

18. A vehicle suspension system comprising:
(a) wheel carrying means for rotatably carrying a wheel of a vehicle, the wheel carrying means being provided with an extension extending upwardly;
(b) a first upper arm member extending in a substantially longitudinal direction of the vehicle and pivotally connected at one end with an upper end portion of said extension and at the other end with a vehicle body member;
(c) a second upper arm member arranged downward of the first upper arm member, extending in a substantially transverse direction of the vehicle and pivotally connected at one end with the wheel carrying means and at the other end with the vehicle body member;

(d) lower arm means connected at one end with a lower portion of the wheel carrying means and at the other end with the vehicle body member for restricting at least a longitudinal and transverse movement of the wheel carrying means and shock absorbing means for absorbing an impact load in an up and down direction, the shock absorbing means being disposed opposite to the first upper arm member with regard to the second upper arm member in the longitudinal direction.

19. A vehicle suspension system as recited in claim 18 wherein the shock absorbing means comprises a coil spring and a damper.

20. A vehicle suspension system comprising:
(a) wheel carrying means for rotatably carrying a wheel of a vehicle, the wheel carrying means being provided with an extension extending upwardly;
(b) a first upper arm member extending in a substantially longitudinal direction of the vehicle and pivotally connected at one end with an upper end portion of said extension and at the other end with a vehicle body;
(c) a second upper arm member arranged downward of the first upper arm member, extending in a substantially transverse direction of the vehicle and pivotally connected at one end with the wheel carrying means and at the other end with a vehicle body cross member;
(d) lower arm means connected at one end with a lower portion of the wheel carrying means and at the other end with the vehicle body cross member for restricting at least a longitudinal and transverse movement of the wheel carrying means.

* * * * *